United States Patent [19]

Ishitsuka

[11] Patent Number: 5,373,944
[45] Date of Patent: Dec. 20, 1994

[54] RECORDING MEDIA CASE
[75] Inventor: Yasuhiro Ishitsuka, Chiba, Japan
[73] Assignee: Hitachi Maxell, Ltd., Osaka, Japan
[21] Appl. No.: 103,511
[22] Filed: Aug. 9, 1993
[30] Foreign Application Priority Data Aug. 12, 1992 [JP] Japan .................. 4-056666[U]

[51] Int. Cl.⁵ .................... B65D 1/36; B65D 85/57
[52] U.S. Cl. .................... 206/444; 206/450; 206/472
[58] Field of Search ............ 206/444, 425, 472, 474, 206/307, 309, 450; 211/40, 41; 40/405

[56] References Cited

U.S. PATENT DOCUMENTS

| | | | |
|---|---|---|---|
| 3,262,454 | 7/1966 | Shillinger | 206/472 X |
| 4,676,374 | 6/1987 | Wilkins | 206/309 X |
| 4,724,956 | 2/1988 | Ozeki | 206/444 X |
| 4,892,189 | 1/1990 | Kunimune et al. | 206/309 X |
| 4,940,142 | 7/1990 | Behrens et al. | 206/444 |
| 5,123,526 | 6/1992 | Gelardi et al. | 206/444 X |
| 5,150,792 | 9/1992 | Munroe | 206/472 X |

Primary Examiner—Paul T. Sewell
Assistant Examiner—Jacob K. Ackun, Jr.
Attorney, Agent, or Firm—Birch, Stewart, Kolasch & Birch

[57] ABSTRACT

A recording media case suitable for filing recording media adapted to prevent the outer side of encased disk cartridges or the like accommodating the recording media from being exposed when the case is used while separate from a file, and thus adapted to completely protect the recording media from dust and external force, the case also having good portability.

16 Claims, 9 Drawing Sheets

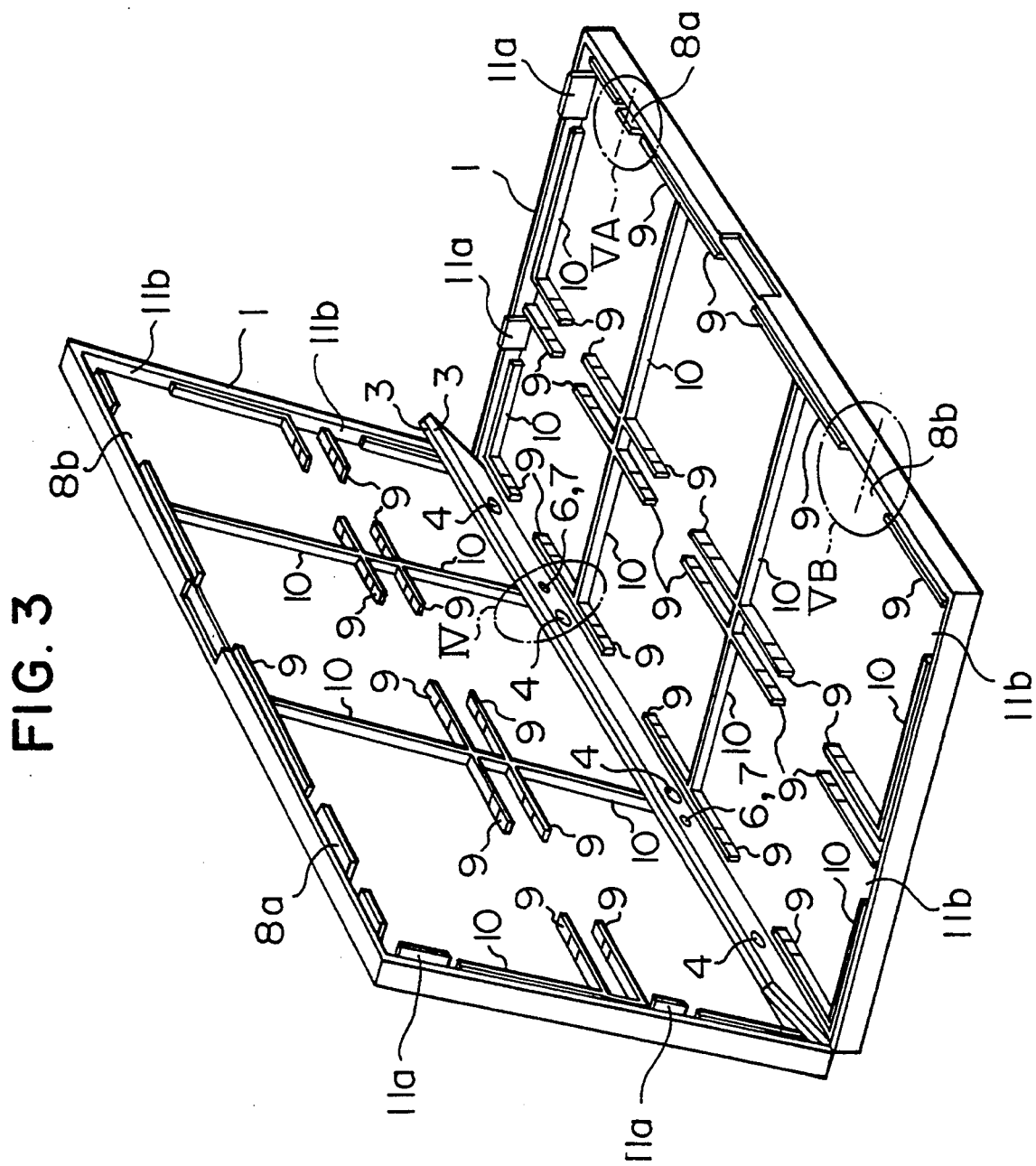

RECORDING MEDIA CASE

BACKGROUND OF THE INVENTION

1. Field of the Invention

The present invention relates to a case for magnetic-recording or optical-recording media, each accommodated in a cartridge casing, which is suitable for filing the encased recording media. More particularly, the present invention relates to such a recording media case suitable for filing that has the improved functions of protecting the encased recording media and has good portability.

2. Description of Related Art

FIG. 10 shows an example of a conventional recording media case for filing recording media units, such as disk cartridges (DCs) in which floppy disks (FDs), serving as the recording media, are individually accommodated in cartridge casings. A DC case 1, substantially sheet-shaped, is capable of containing up to six floppy disk cartridges 2, and has a filing header 3 formed with filing perforations 4. A plurality of such DC cases 1 can be stacked on each other into a file for filing the floppy disks, and can be individually separated from the file for use of the relevant floppy disk.

However, when a DC case 1 is used while separate from the file during the use of one of the floppy disks, the floppy disk cartridges remaining encased are exposed on all or part of one side thereof. As a result, the unused floppy disk cartridges may be contaminated with dust, or subjected to inadvertent external force. Thus, the conventional DC case 1 fails to sufficiently protect the recording media 2. Another problem is that the conventional DC case 1 has a protruded filing header 3, which is inconvenient for carrying.

SUMMARY OF THE INVENTION

The present invention is directed toward overcoming the above-described problems. An object of the present invention is to provide a recording media case suitable for filing recording media (such as magnetic-recording or optical-recording media individually accommodated in cartridge casings or the like), the case being adapted, when used while separate from a file, to prevent the outer side of each encased unit (such as a floppy disk cartridge) from being exposed, and thus to sufficiently protect the encased units from dust or external force, the case also having good portability.

In order to achieve the above object, according to the present invention, there is provided a recording media case suitable for filing recording media which has a body defining therein a recording media casing space, and a filing header section integrally formed with the body with a self-hinge section therebetween. The filing header section is formed with, for example, at lease one boss and at least one hole which are sized for boss-hole engagement. When the case is used while separate from a file, the case is opposed to another case of the same type with their recording media casing spaces positioned inside, and the boss and the hole of one of the cases are fitted into and onto the hole and the boss of the other case in such a manner that the encased recording media will be positioned inside, thereby temporarily fastening the cases together in a book-shaped case assembly. Thus, it is possible to improve the function of the recording media case to protect magnetic- or optical-recording medium encased therein, as well as improve the portability of the case.

A recording media case suitable for filing recording media according to the present invention is a case for magnetic- or optical recording media which are individually accommodated in cartridge casings and which are disk-shaped, card-shaped, sheet-shaped or tape-shaped. The recording media case has a filing header section integrally formed with the body of the case with a self-hinge section therebetween, and includes an attachment and detachment structure, i.e. a detachable attachment structure, provided in the filing header section for allowing the filing header section to be attached to and detached from the filing header section of another such recording media case.

The recording media case according to the present invention may further include opening-prevention means for preventing the opening of a book-shaped case assembly when the assembly, formed by two opposed cases fastened at their header sections as described above, is in its closed position.

Accordingly, even when the recording media case is used while separate from the file, the recording media units encased therein can be prevented from being exposed on one side thereof, and can be sufficiently protected from dust or external force.

In a specific arrangement of a recording media case according to the invention, a recording media case suitable for filing recording media has, as will be described later with reference to FIGS. 1 and 6, a filing header section integrally formed with the body of the case with a self-hinge section therebetween. The filing header section is formed with an attachment and detachment structure by which the filing header section of the case can be attached to and detached from the filing header section of another such recording media case, the structure comprising either a boss (fitting-engagement projection) and a hole (fitting-engagement socket) which are for engagement by direct fitting, or an engagement projection and an engagement socket which are for engagement after sliding relative to each other.

In another specific arrangement of a recording media case according to the present invention, a disk cartridge case has, as will be described with reference to FIG. 3, a body defining therein a recording media casing space, and a filing header section integrally formed with the body with a self-hinge section therebetween, the self-hinge section enabling the filing header section to be bent toward the body by at least 180 degrees. The recording media case includes an attachment and detachment structure provided in the filing header section, the attachment and detachment structure allowing the filing header sections of a pair of such recording media cases to be stacked on each other with the recording media casing spaces of the cases opposed to each other and with the filing header sections bent toward the bodies of the cases so that the cases can be detachably assembled into a book-shaped case assembly capable of opening and closing by swinging about the self-hinge sections of the cases.

An attachment and detachment structure provided in the filing header section of a recording media may comprise either a fitting engagement structure allowing a projection (boss) and a socket (hole) to fitting-engage with each other, as will be described with reference to FIGS. 2B and 2C, or a structure allowing a projection and a socket to slide relative to each other into mutual engagement, as will be described with reference to FIGS. 8 and 9, by causing the projection to slide in the socket from a large-diameter end portion of the socket toward a small-diameter end portion thereof.

An attachment and detachment structure provided in the filing header section of a recording media case may include at least one projection and at least one socket formed at positions symmetrical with each other with respect to the center of the longitudinal dimension of the filing header section, such attachment and detachment structures allowing the filing header sections of a pair of such recording media cases to be stacked on each other with the recording media casing spaces of the cases opposed to each other and with the filing header sections bent toward the bodies of the cases so that the cases can be detachably assembled into a book-shaped case assembly capable of being opened and closed by swinging about the self-hinge sections of the cases. This arrangement permits a plurality of recording media cases made of a thermoplastic material to be formed with a single mold, thereby enabling significant reduction in equipment and production costs, which is a great advantage in economizing.

A recording media case according to the present invention may further include, as will be described with reference to FIGS. 5A and 5B, a lock device for preventing a pair of recording media cases combined in a book-shaped assembly from swinging to an open position thereof when the assembly is to maintain its closed position. The lock device may comprise a lock protrusion and a lock recess formed at symmetrical positions of the body and capable of fitting in a recess and fitting on a protrusion, respectively.

A recording media case according to the present invention may further include, as will be described with reference to FIGS. 2A to 2C, a plurality of elastic ribs and a plurality of fixed ribs formed in the body within the casing space for retaining recording media so as to prevent the recording medium from being damaged due to shock or the like.

In order to position a pair of recording media cases to be combined into a book-shaped case assembly, a recording media case according to the present invention may further include either at least one set of a position regulating protrusion and a position regulating recess provided at symmetrical positions of the body, as will be described with reference to FIG. 3, or a positioning engagement protrusion and a positioning engagement recess provided at symmetrical positions of the body, as will be described with reference to FIG. 6 and FIGS. 7C and 7D. The position regulating protrusion and recess may respectively have substantially the same construction as the lock protrusion and recess mentioned above, which will be described further with reference to FIGS. 5A and 5B.

A recording media case according to a preferred embodiment of the present invention is made of a thermoplastic resin material. A resin material, such as a polypropylene resin, which has great elasticity, crystallinity and mechanical strength, and which also has good fluidity, small shrinkage and good moldability, can be advantageously used. So long as a resin material is able to provide the above properties, its type and composition are not specifically limited to the above-mentioned example. A resin material for forming a recording media case may additionally contain various reinforcing fibers or reinforcing fillers.

BRIEF DESCRIPTION OF THE DRAWINGS

FIG. 3 is a perspective view showing a pair of disk cartridge cases according to the embodiment shown in FIG. 1 combined with each other;

DESCRIPTION OF THE INVENTION

The present invention will now be described in detail by embodiments thereof with reference to the accompanying drawings. Embodiment 1

Figure 1:
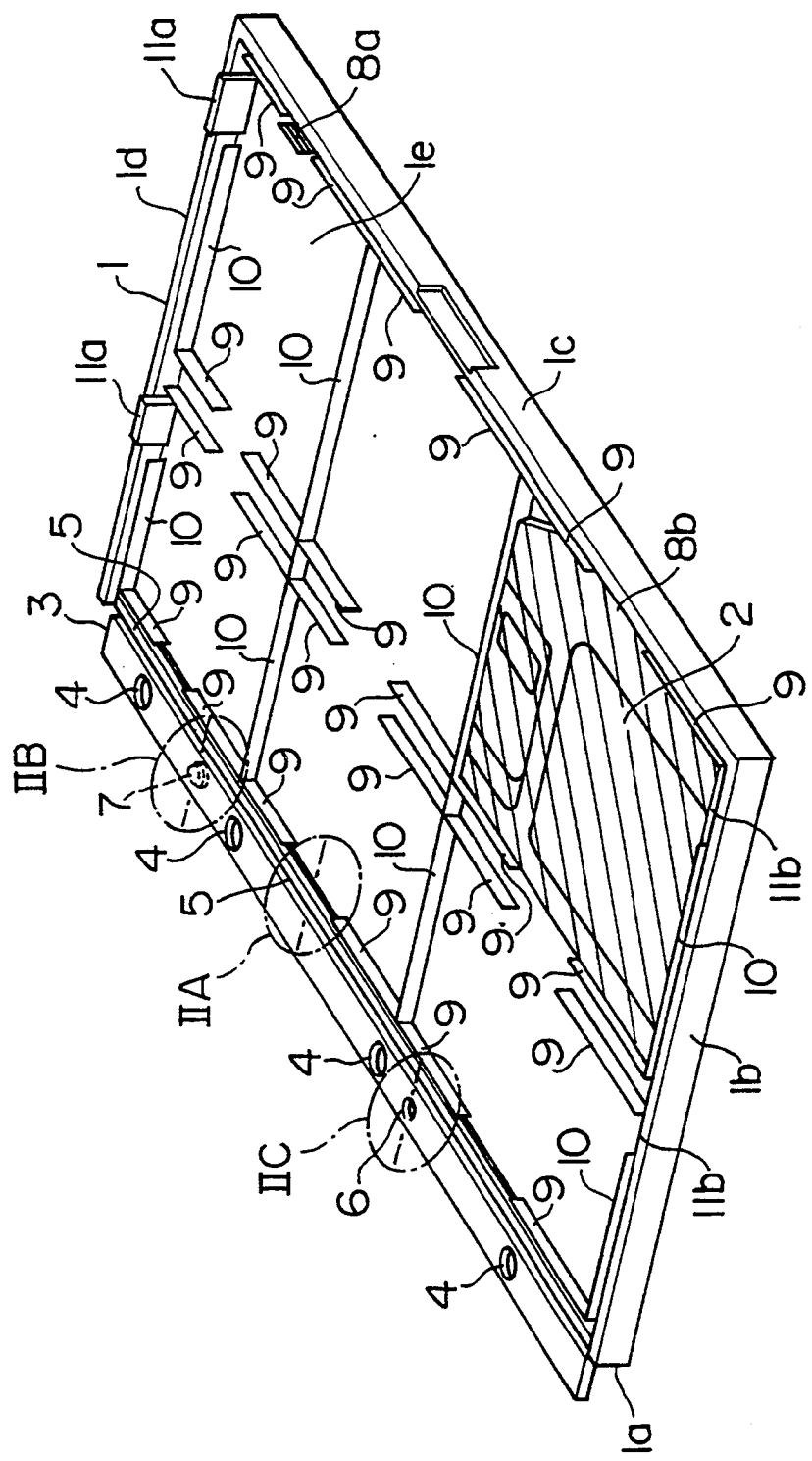
FIG. 1 is a perspective view of a disk cartridge case according to an embodiment of the present invention, showing an example of the construction of the case.

FIG. 1 shows, in a perspective view, an example of the construction of a recording media case, such as a disk cartridge case, according to an embodiment of the present invention, the case being of an A4 file size in this example. The case has a self-hinge section 5 shown in an enlarged sectional view in FIG. 2A, and includes a boss (engagement projection) 7 and a hole (engagement socket) 6 shown in enlarged sectional views in FIGS. 2B and 2C, respectively.

In the illustrated example, a disk cartridge (DC) case 1 according to the embodiment has a body having four side walls (i.e., rear, left, front and right side walls 1a, 1b, 1c and 1d, respectively, as viewed in FIG. 1) and a bottom 1e, which together define a casing space in the body for containing up to six 3.5-inch floppy disk (FD) cartridges. The DC case 1 also has a filing header section 3 integral with the body through a self-hinge section 5 therebetween. The filing header section 3 is formed with filing perforations 4. As shown in FIG. 1, the filing header section 3 is also formed with the hole 6 (socket) and the boss 7 (projection), which together constitute a characteristic feature of the present invention. The hole 6 and the boss 7 are formed at positions symmetrical with each other with respect to the center of the longitudinal dimension of the filing header section 3, and are capable of being removably fitted on another such boss and in another such hole, respectively, for achieving a hole-boss fitting-engagement.

Figure 2A:
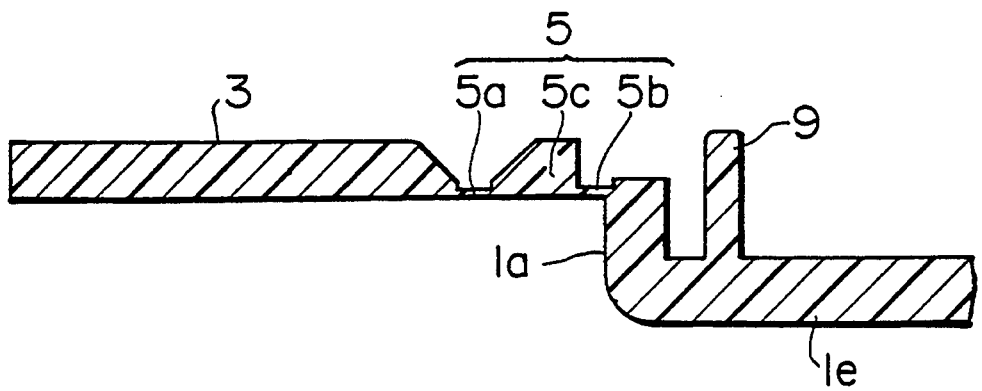
FIGS. 2A, 2B and 2C are enlarged sectional views of portions indicated by reference characters IIA, IIB and IIC, respectively, in FIG. 1, FIGS. 2A to 2C showing the construction of a self-hinge section, a boss and a hole of the disk cartridge case.

As shown in FIG. 2A, the self-hinge section 5 is disposed between the rear side wall 1a of the body and the filing header section 3, and comprises three portions, that is, a portion 5b integrally formed with the wall 1a and subsequent portions 5c and 5a, the portion 5a being integrally formed with the filing header section 3. The above self-hinge section 5 enables the filing header 3 to be bent or folded toward the body of the DC case 1 (i.e., bent inward) by an an angle of 180 degrees.

Figure 2B:
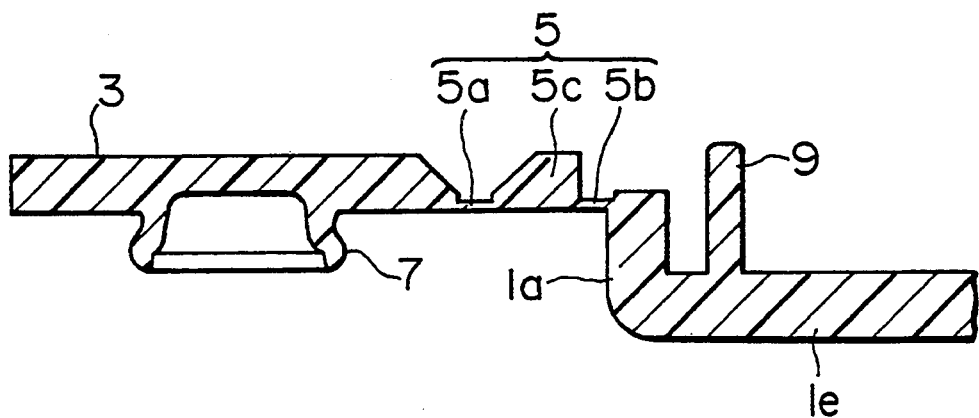
Figure 2C:
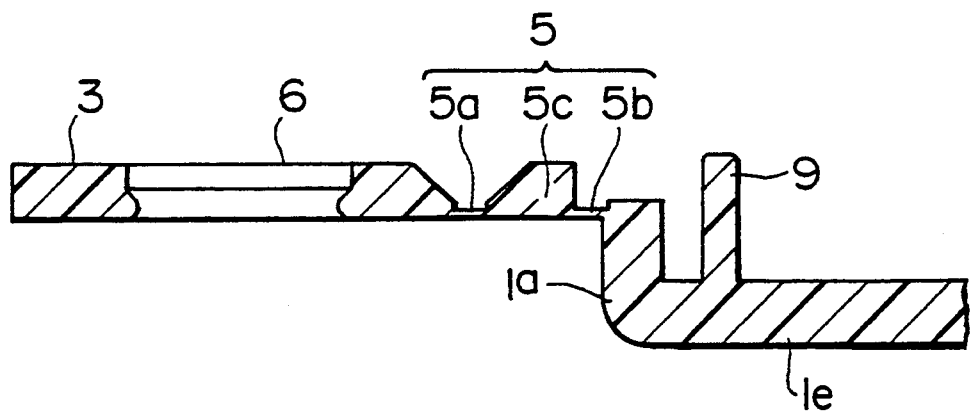

As will be understood from FIG. 2B, at the portion of the case 1 where the boss 7 is formed, the self-hinge section 5 causes the boss 7 to be directed upward when the filing header section 3 is bent inward by 180 degrees. As will be understood from FIG. 2C, at the portion of the case 1 where the hole 6 is formed, the self-hinge section 5 renders the hole 6 capable of being engaged with a boss 7 projecting from a filing header section 5 of another such DC case 1 when the respective filing header sections 5 of the DC cases 1 are bent inward by 180 degrees.

When the DC case 1 shown in FIG. 1 is separated from a file, the case 1 can be combined with another DC case of the type shown in FIG. 1 into a book-shaped case assembly in the following manner: the casing spaces of a pair of DC cases 1 are opposed to each other, and the holes 6 and the bosses 7 of the DC cases 1 are brought into hole-boss fitting-engagement. A DC case 1 of the type being described has the hole 6 and the boss 7 capable of fitting-engagement with the boss 7 and hole 6 of another DC case i regardless of whether the filing header sections 5 of the cases 1 are bent inward or not. However, the embodiment will be described focusing on the manner of combining a pair of DC cases in which the hole-boss fitting-engagement is established between an inwardly bent filing header section of one DC case and another inwardly bent filing header section of another DC case, as shown in FIG. 3. Thus, a pair of DC cases 1 are detachably assembled into a book-shaped casing assembly.

Figure 4A:
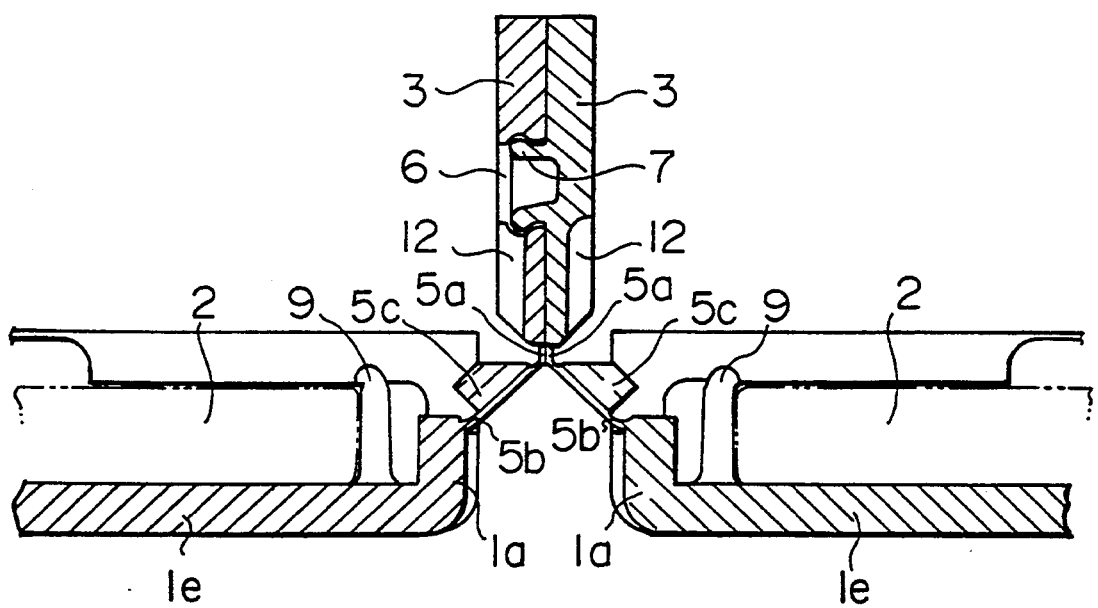
FIGS. 4A and 4B are enlarged sectional views of portions indicated by reference character IV in FIG. 3, FIG. 4A showing the state of filing header sections of the combined disk cartridges cases when the cases are open, and FIG. 4B showing the state of the filing header sections when the cases are closed.
Figure 4B:
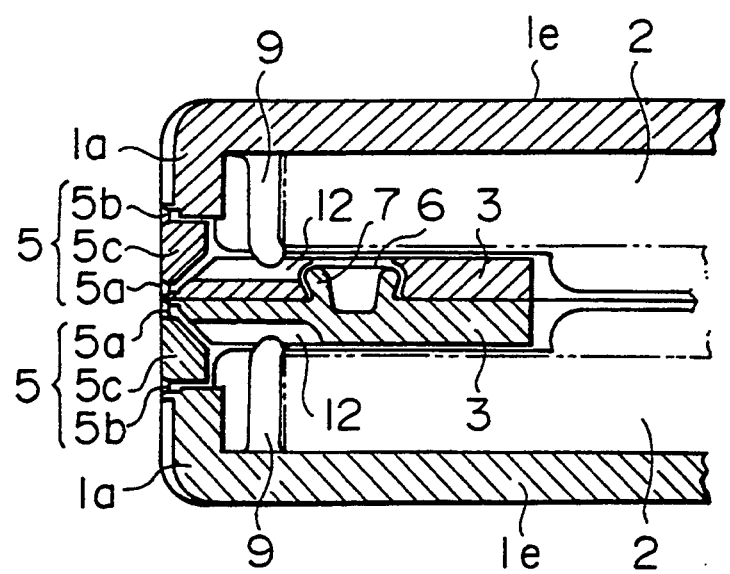

A portion indicated by reference character IV in FIG. 3 is shown in enlarged sectional views in FIGS. 4A and 4B. In FIG. 4A, the combined DC cases 1 are opened away from each other by swinging about the self-hinge sections 5, with the filing header sections 3 of the cases 1 attached to each other and positioned perpendicular to the bodies of the cases 1. In FIG. 4B, the combined DC cases 1 are closed to each other by swinging about the self-hinge sections 5, with the filing header sections 3 attached to each other and positioned at an innermost location of the book-shaped case assembly.

Figure 5A:
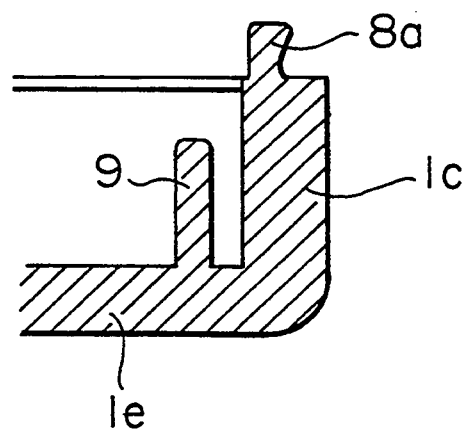
FIGS. 5A and 5B are enlarged sectional views of portions indicated by reference characters VA and VB, respectively, in FIG. 3, showing the construction of lock members of the disk cartridge case according to the embodiment shown in FIG. 1.
Figure 5B:
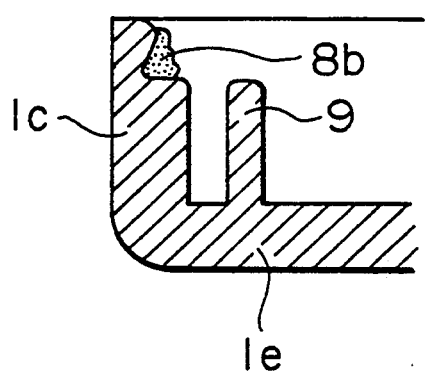

As shown in FIGS. 1 and 3, a DC case 1 includes elastic ribs 9 and fixed ribs 10 formed in the body for retaining FD cartridges 2 encased in the casing space. Further, a lock protrusion 8a and a lock recess 8b (shown in enlarged section in FIGS. 5A and 5B, respectively) are formed at mutually symmetrical positions of the body so that, when a pair of DC cases 1 combined into a book-shaped case assembly are closed, the cases 1, 1 may not be inadvertently brought into an opened position. In order that a pair of DC cases 1 to be combined together can be precisely stacked on each other with their casing spaces opposed to each other, position regulating protrusions 11a and position regulating recesses 11b of substantially the same construction as the lock protrusion 8a and lock recess 8b, respectively, are also provided in the body of a DC case 1.

With the above-described arrangement, even when the DC case 1 is separated from a file for using one of the encased FD cartridges 2, the other FD cartridges 2 remaining in the DC case 1 are prevented from being exposed on one side thereof, and are stored completely within a book-shaped case assembly. Thus, substantially complete protection from dust or external force is possible. The book-shaped case assembly affords improved portability.

EMBODIMENT 2

Figure 6:
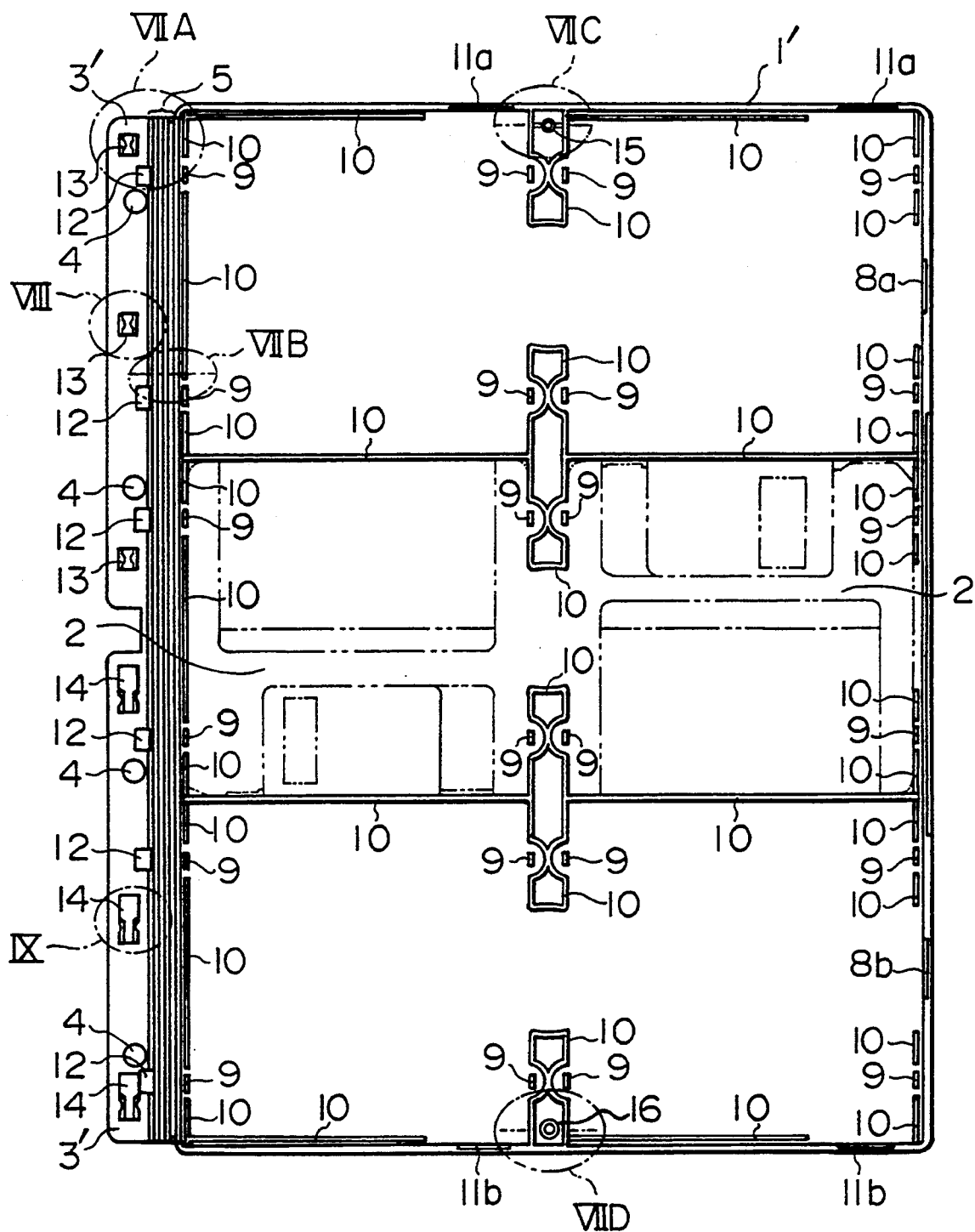
FIG. 6 is a plan view of a disk cartridge case according to another embodiment of the present invention, showing an example of the construction of the case.

FIG. 6 shows an example of the construction of a recording media case, such as a disk cartridge (DC) case, according to another embodiment of the present invention, the DC case being of an A4 file size in this example. The case can be combined with another such DC case into a book-shaped closed case assembly by bending inward the filing header sections of the DC cases and moving the bent filing header sections relative to each other to cause relative sliding and mutual engagement of engagement projections and sockets formed in the filing header sections.

Figure 7A:
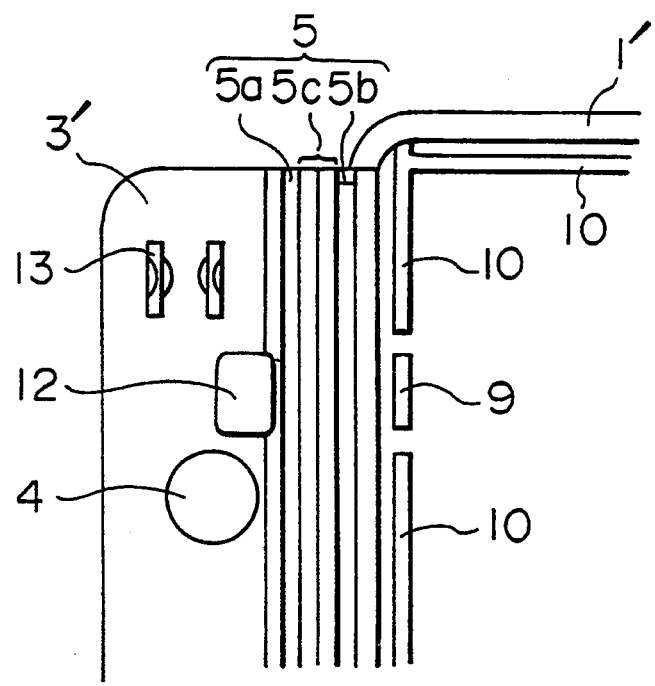
FIGS. 7A to 7D are enlarged views of portions indicated by reference characters VIIA to VIID, respectively, in FIG. 6, showing the construction of a self-hinge section, a filing header section and a positioning engagement section of the disk cartridge case according to the embodiment shown in FIG. 6.
Figure 7B:
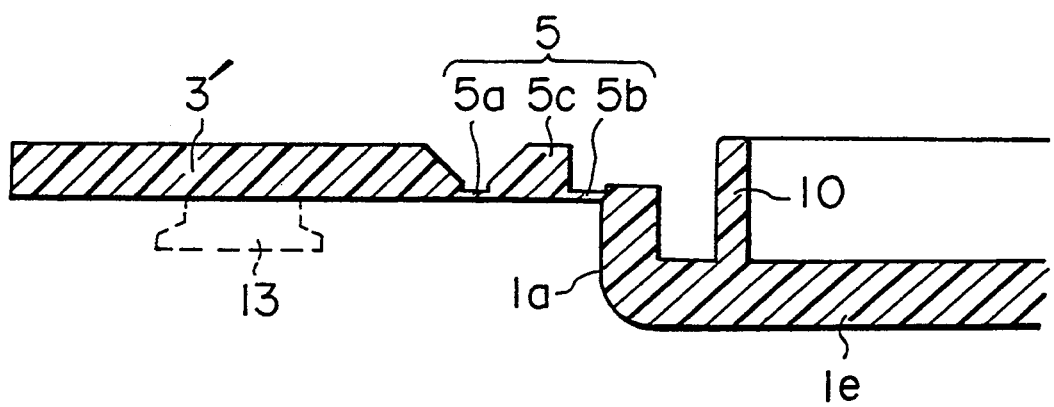
Figure 7C:
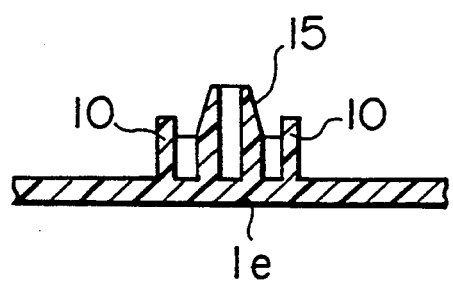
Figure 7D:
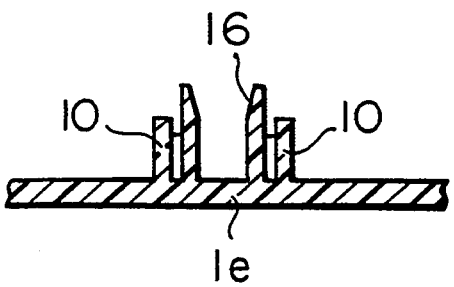

The DC case according to the second embodiment has a filing header section 3' having portions indicated by reference characters VIIA and VIIB in FIG. 6 and shown in enlarged plan and sectional views in FIGS. 7A and 7B, respectively, and has a body including portions indicated by reference characters VIIC and VIID and shown in enlarged sectional views in FIGS. 7C and 7D, respectively.

The DC case 1' according to the second embodiment has substantially the same construction as the DC case 1 according to the previous embodiment shown in FIG. 1, except that the DC case 1' of the second embodiment includes the following: engagement projection 1 elements 13 and engagement socket elements 14 formed in the filing header section 3' for assembling the DC case 1' into a book-shaped closed case assembly; and a positioning engagement protrusion 15 and a positioning engagement recess 16 for positioning a pair of cases 1', 1' when the cases 1', 1' are to be opposed to each other and combined together.

Figure 8A:
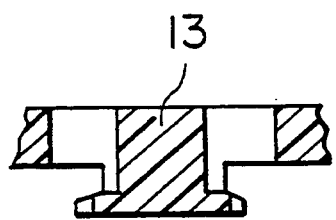
FIGS. 8A and 8B are an enlarged sectional view and an enlarged plan view, respectively, of a portion indicated by reference character VIII in FIG. 6, showing the construction of an engagement projection of the disk cartridge case according to the embodiment shown in FIG. 6.
Figure 8B:
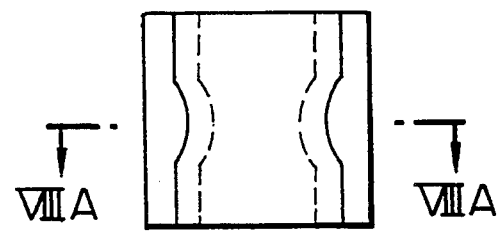
Figure 9A:
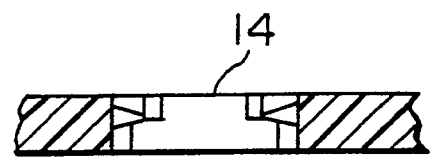
FIGS. 9A and 9B are an enlarged sectional view and an enlarged plan view, respectively, of a portion indicated by reference character IX in FIG. 6, showing the construction of an engagement socket of the disk cartridge case according to the embodiment shown in FIG. 6.

As denoted by reference characters VIII and IX, respectively, in FIG. 6, the filing header section 3' of the DC case 1' is formed with the engagement projection elements 13 and the engagement socket elements 14. Each projection element 13 is constructed as shown in an enlarged plan view in FIG. 8B and an enlarged sectional view in FIG. 8A taken along line VIIIA—VIIIA shown in FIG. 8B, while each socket element 14 is constructed as shown in an enlarged plan view in FIG. 9B and an enlarged sectional view in FIG. 9A taken along line IXA—IXA shown in FIG. 9B. When the filing header section 3' of one DC case 1' is moved relative to the filing header section 3' of the other DC case 1', each engagement projection element 13 of one or another DC case 1' is slid into and engaged with a corresponding engagement socket element 14 of the other or one DC case 1'.

Figure 9B:
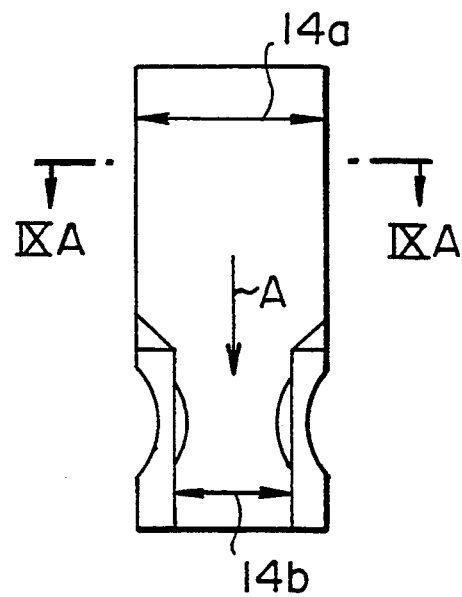
Figure 10:
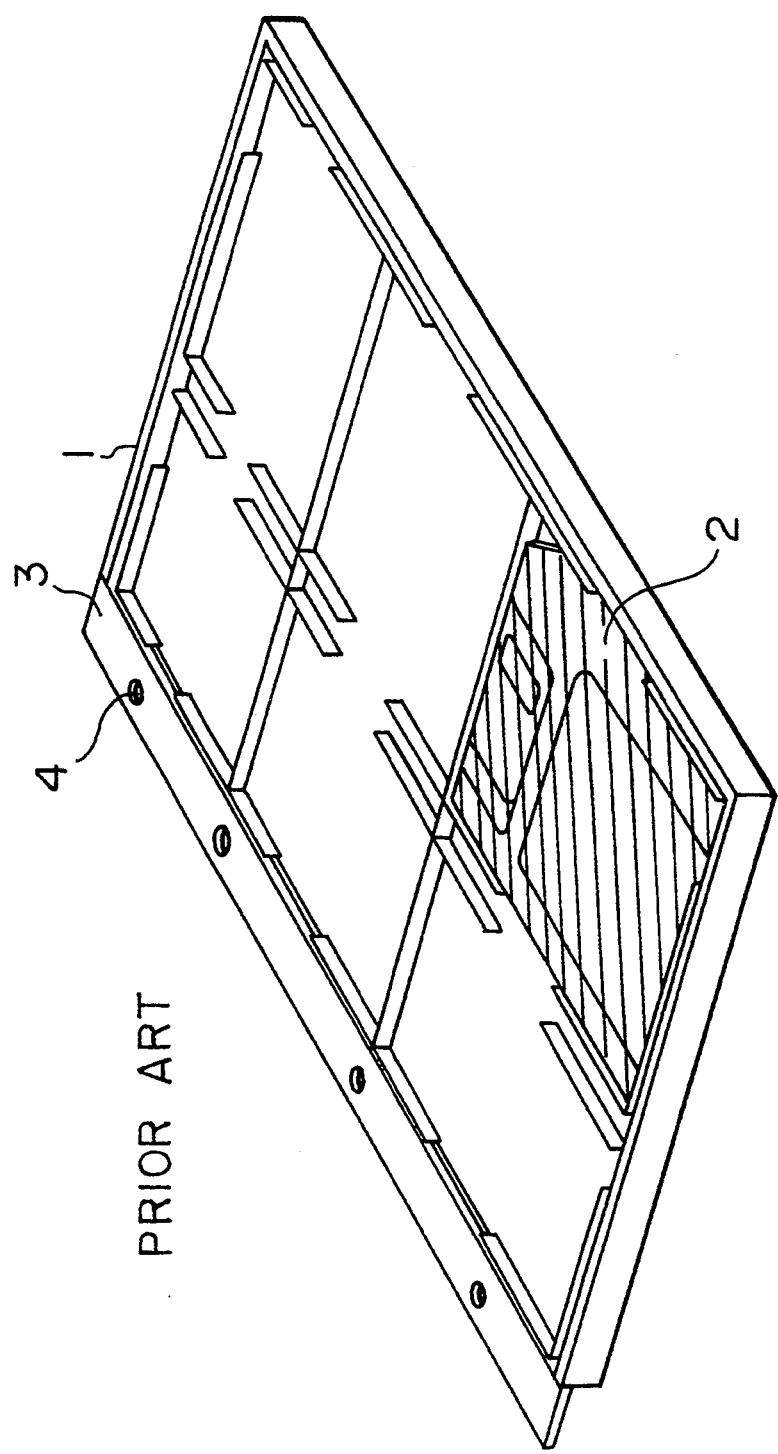
FIG. 10 is a perspective view of a conventional floppy disk cartridge case for filing.

In this process, the engagement projection element 13 slides in the engagement socket element 14 in a direction of an arrow A from a large-diameter end portion 14a of the socket element 14 to a small-diameter end portion 14b thereof (see FIG. 9B).

When a pair of DC cases 1', 1' are to be opposed to each other and combined together, the positioning engagement protrusion 15, shown in FIG. 7C, is brought into fitting-engagement with the positioning engagement recess 16, shown in FIG. 7D.

The above-described arrangement of the second embodiment provides advantages similar to those of the first embodiment, that is, substantially complete protection from dust and inadvertent external force owing to the ability to store recording media completely within a book-shaped case assembly, and improved portability and usability owing to the ability to be easily formed into a book-shaped case assembly.

Thus, a recording media case according to the present invention is, when separate from a file, capable of being combined with another such recording media case into a book-shaped case assembly. Accordingly, the case is capable of preventing the outer side of encased recording media units from being exposed, and hence, capable of providing substantially complete protection from dust, etc., and preventing recording media from being damaged due to inadvertent external force.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A recording media case suitable for filing recording media, comprising:
    a body having four side walls defining therein a recording media casing space, said four side walls including longitudinally extending rear and front side walls joined by left and right side walls extending parallel to each other connecting ends of said longitudinally extending side walls,
    means for attaching and detaching said body of said media recording case relative to a file, said means comprising a filing header section extending longitudinally to said rear side wall of said body, and
    means for connecting said filing header section to said rear side wall of said body, said means comprising a self-hinge section extending longitudinally between said filing header section and said rear side wall of said body, enabling said filing header section to be bent toward said body by at least 180°,
    said filing header section further including means for attaching and detaching said recording media case to another such recording media case by way of corresponding filing header sections of each of said recording media cases.

2. A recording media case according to claim 1, wherein said attachment and detachment means provided in the filing header section is selected from a configuration of a projection and a socket to engage with each other and a configuration wherein a projection and a socket slide relative to each other into mutual engagement.

3. A recording media case according to claim 1, wherein said attachment and detachment means provided in the filing header section includes at least one projection and at least one socket formed at positions symmetrical with each other with respect to the center of said longitudinal extension of said filing header section, said attachment and detachment means allowing filing header sections of a pair of said recording media cases to be fitted on each other with said recording media casing spaces of said cases being opposed to each other and with said filing header sections bent toward said bodies of said cases so that said cases can be detachably assembled into a book-shaped case assembly capable of being opened and closed by swinging about said self-hinge sections of said cases.

4. A recording media case according to claim 1, further comprising a lock means for preventing a pair of combined recording media cases in a closed position from swinging to an open position.

5. A recording media case according to claim 4, wherein said lock means comprises a protrusion and a recess formed at symmetrical positions of said body, capable of fitting in a recess and fitting on a protrusion, respectively.

6. A recording media case according to claim 1, further comprising a plurality of elastic ribs and a plurality of fixed ribs formed on said body within said casing space for defining individual casing spaces for retaining recording media.

7. A recording media case according to claim 1, further comprising at least one set of a position regulating protrusion and a position regulating recess provided at symmetrical positions of said body for positioning a pair of recording media cases to be combined together.

8. A recording media case according to claim 1, further comprising a positioning engagement section having a protrusion and a recess provided at symmetrical positions of said body for positioning a pair of recording media cases to be combined together.

9. A recording media case suitable for filing recording media, comprising:
    a body having four side walls defining therein a recording media casing space, said four side walls including longitudinally extending rear and front side walls joined by left and right side walls extending parallel to each other connecting ends of said longitudinally extending side walls,
    means for attaching and detaching said body of said media recording case relative to a file, said means comprising a filing header section extending longitudinally to said rear side wall of said body, and
    means for connecting said filing header section to said rear side wall of said body, said means comprising a self-hinge section extending longitudinally between said filing header section and said rear side wall of said body, enabling said filing header section to be bent toward said body by at least 180°,
    said filing header section further including means for attaching and detaching said recording media case to another such recording media case by way of corresponding filing header sections of each of said recording media cases such that a pair of said recording media cases are stacked on each other, with the recording media casing spaces of said respective cases being opposed to each other and with said filing header sections being bent toward said bodies of said cases so that said cases are detachably assembled into a bookshaped case assembly capable of being opened and closed by swinging about said self-hinge sections of said cases.

10. A recording media case according to claim 9, wherein said attachment and detachment means provided in the filing header section is selected from a configuration of a projection and a socket to engage with each other and a configuration wherein a projection and a socket slide relative to each other into mutual engagement.

11. A recording media case according to claim 9, wherein said attachment and detachment means provided in the filing header section includes at least one projection and at least one socket formed at positions symmetrical with each other with respect to the center of said longitudinal extension of said filing header section, said attachment and detachment means allowing filing header sections of a pair of said recording media cases to be fitted on each other with said recording media casing spaces of said cases opposed to each other and with said filing header sections bent toward the bodies of said cases so that said cases can be detachably assembled into a book-shaped case assembly capable of being opened and closed by swinging about said self-hinge sections of said cases.

12. A recording media case according to claim 9, further comprising a lock means for preventing a pair of combined recording media cases in a closed position from swinging to an open position.

13. A recording media case according to claim 12, wherein said lock means comprises a protrusion and a recess formed at symmetrical positions of said body, capable of fitting in a recess and fitting on a protrusion, respectively.

14. A recording media case according to claim 9, further comprising a plurality of elastic ribs and a plurality of fixed ribs formed on said body within said casing space for defining individual casing spaces for retaining recording media.

15. A recording media case according to claim 9, further comprising at least one set of a position regulating protrusion and a position regulating recess provided at symmetrical positions of said body for positioning a pair of recording media cases to be combined together.

16. A recording media case according to claim 9, further comprising a positioning engagement section having a protrusion and a recess provided at symmetrical positions of said body for positioning a pair of recording media cases to be combined together.

* * * * *